March 24, 1936.  G. J. VON HAGEL  2,034,843
BATTERY CONNECTER
Filed April 10, 1934
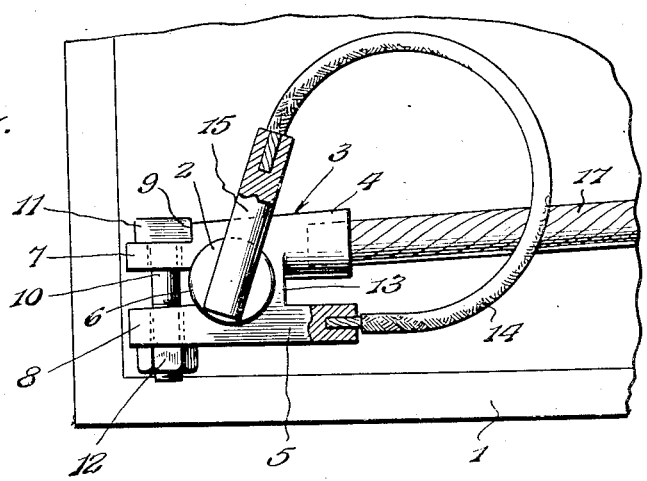
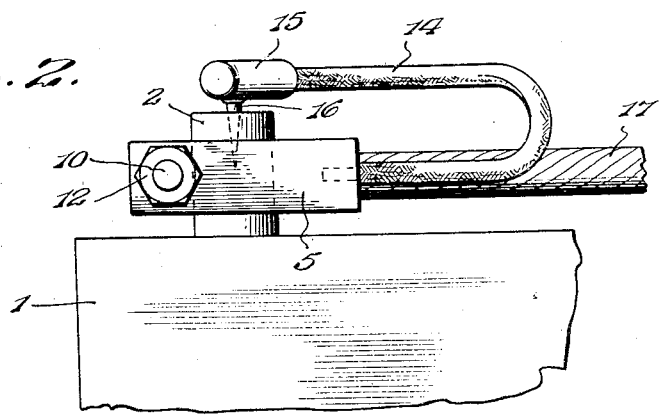
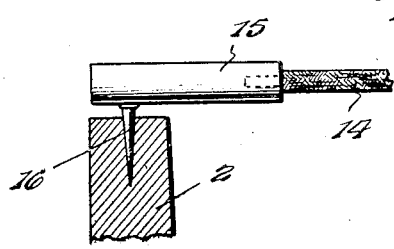
Inventor
G. J. Von Hagel.
By Lacey & Lacey, Attorneys Patented Mar. 24, 1936

2,034,843

UNITED STATES PATENT OFFICE 2,034,843

BATTERY CONNECTER

Gert J. Von Hagel, Akron, Iowa

Application April 10, 1934, Serial No. 719,919

5 Claims. (Cl. 173—259)

This invention relates to an improved battery connecter which is more particularly designed for use in connection with the storage batteries of motor vehicles.

Among other objects, the invention seeks to provide a device of this character having a body adapted to accommodate a battery post and also having a resistance wire carried by the body and connected with the post independently of said body, so that, should the body become disengaged from the post, the resistance wire will provide electrical connection with the battery until repairs can be made.

Another object of the invention is to provide a battery connecter wherein the body is formed with a pair of bosses, one of which is adapted to receive the main cable and the other of which is adapted to accommodate the resistance wire, so that danger of breaking of the resistance wire, due to corrosion or hard use, will be reduced to a minimum.

A further object of the invention is to provide a battery connecter having a resistance wire which, when connected to the battery post, will permit a flow of current sufficient to operate lights, a horn, or other low current consuming devices, but which will not permit the passage of a heavy flow of current such as would be drawn by the self-starter, so that knowledge of the fact that the body of the connecter is loose on, or disconnected from, the post of the battery will be had when it is attempted to crank the car by said starter.

A further object of the invention is to provide a battery connecter wherein the resistance wire employed will assure a constant connection between the battery post and the rest of the circuit so that the burning out of headlights, which would occur if the generator circuit to the battery was broken, will be avoided.

Another object is to provide a battery connecter having a resistance wire terminating in a head which is formed with a contact prong adapted to be sunk into the battery post so that positive connection may be made with the utmost facility.

And the invention has as a still further object to provide a device of this character which may be readily installed and removed from the battery post, will be simple in construction, and cheap to manufacture.

Other and incidental objects of the invention not specifically mentioned in the foregoing, will appear during the course of the following description.

In the drawing forming a part of this application:

Figure 1 is a top plan view showing the improved battery connecter in proper position on a battery post, the battery being shown in fragment and the head employed being shown partially in section.

Figure 2 is a side elevation showing the device properly installed.

Figure 3 is a fragmentary detail sectional view showing the head and prong, employed in connection with the resistance wire, as they would appear with said prong sunk into the post.

Referring now more particularly to the accompanying drawing, wherein like numerals of reference designate like parts, the numeral 1 indicates a portion of a conventional battery such as used in connection with motor vehicles. A battery post is shown at 2 and is of conventional configuration and construction, being formed of relatively soft metal.

In carrying my invention into effect, I employ a body indicated in general by the numeral 3. The body is preferably cast as a single piece from relatively heavy metal such as an alloy of lead and tin, or bronze. The body includes a relatively large boss or lug 4 and spaced therefrom in substantially parallel relation is a relatively small boss or lug 5. Formed in the body at substantially the central portion thereof is a circular opening 6 which is adapted to receive the battery post 2 therein. As will be seen by referring particularly to Figure 1 of the drawing, the body is split at its forward end to define substantially parallel companion projecting lugs 7 and 8, and, as will be observed, the lug 7 is cut away near its inner end to define a shoulder 9.

Extending through the lugs 7 and 8, near their corresponding free ends, is a clamping bolt 10 having a square head 11 which is adapted to seat against the shoulder 9 so that rotation of the bolt will be prevented. A nut 12 is screwed on the bolt and it will be seen that by tightening the nut 12 on the bolt 10, the lugs will be urged toward each other for tightly clamping the body on the post 2. The inner end of the body, at a point between the bosses 4 and 5 and the opening 6, is relatively thin, as shown at 13, so that the bosses will be permitted to shift toward each other sufficiently for freeing the body from the post when the nut 12 is loosened on the bolt 10. It will thus be seen that removal of the body from the post may be effected with the utmost facility.

Connected with the boss 5 is a flexible wire 14 which is preferably formed of relatively high resistance material such as German silver or the like. The wire is shown as being insulated but it will be understood that such insulation is not essential. The opposite end of the wire 14 is secured in a substantially cylindrical soft metal head 15 which is adapted to overlie the post and is provided with a preferably steel contact prong 16 which is welded or otherwise embedded in the soft metal of the head. As will be seen in the drawing, the contact prong is driven into the post 2 at its upper surface and thus serves to provide a positive contact between the post and the head, wire and body. The opposite ends of the wire 14, as best seen in Figure 1 of the drawing, are preferably embedded in the boss 5 and head in such a manner that danger of loosening will be avoided.

The boss 4 is adapted to receive the end of a battery cable, indicated by the numeral 17, and is adapted for connection with the frame of a vehicle or in an electrical circuit in some other manner.

In use, when the battery employed is used in connection with a motor vehicle, the cable 17 is connected to the vehicle frame, or if the negative post of the battery is to be employed, the cable would be connected with the generator and associated accessories. It is well known that in some automobile electrical circuit arrangements, the negative terminal is grounded to the frame while in others the positive terminal is so grounded. After the body of the connecter has been placed on the post and securely clamped thereon by tightening the nut 12 on the bolt 10, the resistance wire is looped, as shown in Figure 1, so that the end of the head 15, with the prong 16 thereon, overlies the center of the post 2. The prong may then be driven into the post by tapping the head with a hammer or the like.

After the device has been in use for a period of time, corrosion may set in around the post so that the body may become loose upon the post. In such event, a poor connection between the body and post would result so that when the self-starter is operated, the heavy drain of current required thereby would not be permitted to pass from the post to the body and thence to the cable. In installations now in use, when such a contingency arises, the vehicle is completely disabled. That is to say, the connection will be broken so that the lights will not function, the horn will not sound, and the ignition coil cannot be energized for starting the car by manual cranking. Furthermore, if the car were in motion and the connection was so broken, it would come to a stop. Such a contingency arising at night would be attended by grave danger to the occupants of the vehicle as the driver, having no lights, might drive off the road and thus cause death or severe injury to himself or any other occupants of the car. However, by using the resistance wire, head and contact prong of the present invention, a permanent connection will be established so that, should the body become loose upon the post, a positive connection will be established and maintained between the post and cable 17, thereby permitting enough current to pass to provide for the requirements of the ignition coil and lights. Inasmuch as a wire of relatively high resistance is employed, the battery will not be permitted to pass enough current through said wire for energizing the starting motor so that the driver will be immediately caused to investigate and locate the loose connection. Even though the vehicle may be in a location remote from a garage it may be cranked by hand and driven to a garage for repairs.

Attention is particularly directed to the fact that when the motor is started and the generator is placed in motion, the connection between the generator and battery will still be complete so that the sudden surging of current from the generator will not cause the lights to burn out or ruin other accessories. Attention is further directed to the fact that as two bosses are employed, one for the main cable and the other for the resistance wire, danger of snapping off the resistance wire, such as might be caused by corrosion or rough handling, will be avoided.

It will be seen that the device is simple in construction and capable of manufacture at a low cost.

Having thus described the invention, what I claim is:

1. A battery connecter including a body having an opening adapted to receive a battery post and being split at its forward end to define companion lugs, means extending through the lugs and adapted for urging the lugs toward each other and clamping the body on the battery post, and means for connecting the body to the post supplemental to the clamping means and comprising a resistance wire whereby a positive connection between the cable, body and post will be provided.

2. A battery connecter including a body split at its forward end to define companion lugs and being formed with an opening adapted to receive a battery post, a bolt extending through the lugs for clamping the body on the post, said body being formed with a boss, and flexible resistance means electrically connecting the boss with the post whereby electrical connection between the post and the body will be provided independent of the clamping connection between the body and post.

3. A battery connecter including a body adapted to receive a battery post, means for clamping the body on the post, a flexible resistance wire having one end connected with the body, a head connected with the other end of said wire, and a contact prong carried by the head and adapted to be sunk into the face of the battery post for establishing positive connection between the body and the post independent of the clamping means.

4. A battery connecter including a body having an opening adapted to receive a battery post, means for clamping the body upon said post, said body being formed with bosses, a flexible resistance wire having an end connected with the other of said bosses, a head carried by the opposite end of said resistance wire and adapted to be positioned to overhang the battery post, and a contact prong mounted on the head and adapted to be sunk into the post for establishing positive connection between the post and body independent of the clamping means.

5. A battery connecter including a body engageable with a battery post, means for clamping said body on said battery post, a cable connected in an electric circuit with the body and post, and resistance means carried by the body and connected with the post, said resistance means having a relatively high resistance with respect to the body and forming a shunt circuit between said body and post.

GERT J. VON HAGEL.